(12) United States Patent
Kim et al.

(10) Patent No.: US 9,722,786 B2
(45) Date of Patent: Aug. 1, 2017

(54) APPARATUS AND METHOD FOR PROCESSING AUTHENTICATION INFORMATION

(71) Applicant: ICTK CO., LTD., Gyeonggi-do (KR)

(72) Inventors: Dong Kyue Kim, Seoul (KR); Byong Deok Choi, Seoul (KR); Dong Hyun Kim, Gyeonggi-Do (KR); Kwang Hyun Jee, Gyeonggi-do (KR)

(73) Assignee: ICTK CO., LTD., Gyeonggi-do (KR)

( * ) Notice: Subject to any disclaimer, the term of this patent is extended or adjusted under 35 U.S.C. 154(b) by 0 days.

(21) Appl. No.: 14/422,668

(22) PCT Filed: Aug. 20, 2013

(86) PCT No.: PCT/KR2013/007468
§ 371 (c)(1),
(2) Date: Feb. 19, 2015

(87) PCT Pub. No.: WO2014/030911
PCT Pub. Date: Feb. 27, 2014

(65) Prior Publication Data
US 2015/0222430 A1   Aug. 6, 2015

(30) Foreign Application Priority Data

Aug. 21, 2012 (KR) .......................... 10-2012-0091197

(51) Int. Cl.
*H04L 9/00* (2006.01)
*H04L 9/08* (2006.01)
(Continued)

(52) U.S. Cl.
CPC .............. *H04L 9/0863* (2013.01); *G09C 1/00* (2013.01); *H04L 9/0866* (2013.01); *H04L 9/14* (2013.01);
(Continued)

(58) Field of Classification Search
None
See application file for complete search history.

(56) References Cited

U.S. PATENT DOCUMENTS

| 2004/0096086 A1 | 5/2004 | Miyasaka et al. |
| 2009/0049307 A1* | 2/2009 | Lin .......................... G06F 21/72 713/185 |

(Continued)

FOREIGN PATENT DOCUMENTS

| CN | 102165458 A | 8/2011 |
| JP | 2009-309758 | 4/2005 |

(Continued)

OTHER PUBLICATIONS

Search Report for PCT/KR2013/007468, dated Nov. 29, 2013.
(Continued)

*Primary Examiner* — Brandon Hoffman
(74) *Attorney, Agent, or Firm* — Marshall, Gerstein & Borun LLP

(57) ABSTRACT

Provided is an information processing apparatus including a physical unclonable function (PUF) to generate a unique key using a process variation in a semiconductor manufacturing process, and an encryption unit to encrypt a password and/or bio-information received from a user using the unique key.

23 Claims, 13 Drawing Sheets

(51) Int. Cl.
*H04L 9/32* (2006.01)
*H04L 9/14* (2006.01)
*G09C 1/00* (2006.01)

(52) U.S. Cl.
CPC .......... *H04L 9/3226* (2013.01); *H04L 9/3231* (2013.01); *H04L 9/3278* (2013.01); *H04L 2209/12* (2013.01); *H04L 2209/24* (2013.01)

(56) References Cited

U.S. PATENT DOCUMENTS

| 2011/0002461 A1 | 1/2011 | Erhart et al. | |
| 2011/0191837 A1* | 8/2011 | Guajardo Merchan . | G06F 21/32 726/6 |
| 2012/0179952 A1 | 7/2012 | Tuyls et al. | |
| 2012/0324310 A1* | 12/2012 | Oshida .................. | H04L 9/3278 714/755 |
| 2013/0142329 A1* | 6/2013 | Bell ....................... | H04L 9/0866 380/44 |

FOREIGN PATENT DOCUMENTS

| KR | 10-2009-0007433 | 1/2009 |
| KR | 10-2009-0068987 | 6/2009 |
| KR | 10-0926214 B1 | 11/2009 |
| TW | 200917083 A | 4/2009 |
| WO | WO-2010/035202 A1 | 4/2010 |

OTHER PUBLICATIONS

Fruhashi et al., "The Arbiter-PUF with High Uniqueness Utilizing Novel Arbiter Circuity with Delay-Time Measurement," 2011 IEEE International Symposium on Circuits and Systems (ISCAS), pp. 2325-2328, May 15, 2011.

Lofstrom, K., et al. "IC identification circuit using device mismatch," Solid-State Circuits Conference, Digest of Technical Papers, IEEE International, pp. 372-373, Feb. 9, 2000.

Extended European Search Report for European Patent Application 13830460.5, dated Mar. 11, 2016.

Office Action issued in Taiwanese Patent Application No. 102129906 dated Dec. 12, 2016.

Office Action issued in Chinese Patent Application No. 201380043603.3, mailed May 2, 2017.

* cited by examiner

APPARATUS AND METHOD FOR PROCESSING AUTHENTICATION INFORMATION

FIELD OF THE INVENTION

The present invention relates to digital security, and more particularly, to an apparatus and method of storing and processing bio-information. Particularly, the present invention relates to a method of securely storing and processing bio-information and/or a user password to be used for security/authentication of a device, such as an embedded system, a system on chip (SoC), a smart card, and a universal subscriber identity module (USIM) of an electronic device.

DESCRIPTION OF THE RELATED ART

With an information-oriented society advanced, the necessity for personal privacy protection increases and security of authentication tools emerges as an important technical issue.

Particularly, in electronic banking, smart cards, and machine to machine (M2M) technologies, an authentication key to identify a user or a device is required to have high-level credibility in security. In the following specification, the authentication key will be referred to as an "identification key" or simply as a "key."

Authentication may include possession-based authentication and knowledge-based authentication. Possession-based authentication is carried out by possessing a particular object, while knowledge-based authentication is carried out via a password.

Since there are strengths and weaknesses in possession-based authentication and knowledge-based authentication, both possession-based authentication and knowledge-based authentication are adopted for security of authentication.

Meanwhile, a physically unclonable function (PUF) may provide an unpredictable digital value. Each individual PUF provides a different digital value even though PUFs are provided with an exact manufacturing process and are manufactured according to the same process.

Thus, the PUF may be also referred to as a physical one-way function (POWF) that is practically impossible to duplicate.

The PUF may be used for generating an encrypted key for security and/or authentication. For example, the PUF may be used to provide a unique key to distinguish devices from one another.

However, when a key that the PUF generates is used for authentication as it is, a user may have difficulty in remembering the identification key. Meanwhile, to use a user input password and/or user bio-information as an authentication key, the user input password and/or user bio-information needs protecting at high-level security when stored in a terminal.

SUMMARY OF THE INVENTION

An exemplary embodiment of the present invention provides an information processing apparatus including a physical unclonable function (PUF) to generate at least one unique key using a process variation in a semiconductor manufacturing process, and an encryption unit to encrypt a password received from a user using the unique key to generate an identification key.

The PUF may generate the unique key using whether an interlayer contact formed between conductive layers of a semiconductor short-circuits the conductive layers.

The interlayer contact formed between the conductive layers of the semiconductor may be formed to have a smaller size than that according to a design rule provided in the semiconductor manufacturing process.

The PUF may be configured to set the size of the interlayer contact formed between the conductive layers of the semiconductor such that a difference between a probability of the interlayer contact short-circuiting the conductive layers and a probability of the interlayer contact not short-circuiting the conductive layers is within a preset error range.

The PUF may include N unit structures to generate a 1-bit digital value using a pair of conductive layers and one interlayer contact connecting the conductive layers and generate N-bit unique keys through the N unit structures, N being a natural number.

The PUF may generate N-bit digital values, and the information processing apparatus may group digital values included in the N-bit unique keys by k units, compare a first group with a second group among a plurality of groups, and determine a digital value representing the first group and the second group as 1 when a value of k digital bits included in the first group is greater than a value of k digital bits included in the second group, k being a natural number.

The information processing apparatus may selectively determine the digital value representing the first group and the second group as either one of 1 and 0 or not determine the digital value representing the first group and the second group based on a setting when the value of the k digital bits included in the first group is the same as the value of the k digital bits included in the second group.

The encryption unit may encrypt the password N times using the unique key as a round key to generate the identification key, N being a natural number.

The encryption unit may encrypt the password in accordance with an advanced encryption standard (AES) or a triple data encryption standard (T-DES) to generate the identification key.

An exemplary embodiment of the present invention provides an information processing apparatus including a physical unclonable function (PUF) to generate at least one unique key using a process variation in a semiconductor manufacturing process, and an encryption unit to encrypt input bio-information using the unique key to generate an identification key.

The PUF may generate the unique key using whether an interlayer contact formed between conductive layers of a semiconductor short-circuits the conductive layers.

The interlayer contact formed between the conductive layers of the semiconductor may be formed to have a smaller size than that according to a design rule provided in the semiconductor manufacturing process.

The PUF may be configured to set the size of the interlayer contact formed between the conductive layers of the semiconductor such that a difference between a probability of the interlayer contact short-circuiting the conductive layers and a probability of the interlayer contact not short-circuiting the conductive layers is within a preset error range.

An exemplary embodiment of the present invention provides an information processing apparatus including at least one physical unclonable function (PUF) to generate a unique key of at least one digital value using a process variation in a semiconductor manufacturing process and an encryption unit to encrypt at least one of a password received from a user and bio-information using at least one unique key provided by at least one of the at least one PUF to generate an identification key.

The encryption unit may encrypt the at least one of the password and the bio-information N times using the at least one unique key as a round key to generate the identification key, N being a natural number.

The encryption unit may encrypt the at least one of the password and the bio-information in accordance with an advanced encryption standard (AES) or a triple data encryption standard (T-DES) to generate the identification key.

Each of the at least one PUF may generate the unique key using whether an interlayer contact formed between conductive layers of a semiconductor short-circuits the conductive layers.

The interlayer contact may be formed to have a smaller size than that according to a design rule provided in the semiconductor manufacturing process.

The PUF may be configured to set the size of the interlayer contact formed between the conductive layers of the semiconductor such that a difference between a probability of the interlayer contact short-circuiting the conductive layers and a probability of the interlayer contact not short-circuiting the conductive layers is within a preset error range.

The information processing apparatus may further include a PUF selection unit to select a PUF to be used by the encryption unit for encrypting among the at least one PUF.

An exemplary embodiment of the present invention provides an information processing method including generating, by a physical unclonable function (PUF) of an information processing apparatus, at least one unique key using a process variation in a semiconductor manufacturing process, and encrypting, by an encryption unit of the information processing apparatus, at least one of a first user input password and first user bio-information input to the information processing apparatus using the unique key to generate at least one of an encrypted password and encrypted bio-information.

The information processing method may further include encrypting at least one of a second user input password and second user bio-information when the at least one of the second user input password and the second user bio-information is input to the information processing apparatus from a user, and comparing, by an authentication unit of the information processing apparatus, at least one of the encrypted second user input password and the encrypted second user bio-information with the at least one of the encrypted password and the encrypted bio-information.

The information processing method may further include decrypting, by the encryption unit of the information processing apparatus, at least one of the encrypted password and the encrypted bio-information to generate the at least one of the first user input password and the first user bio-information when the at least one of the second user input password and the second user bio-information is input to the information processing apparatus from a user, and comparing, an authentication unit of the information processing apparatus, the at least one of the decrypted first user input password and the decrypted first user bio-information with at least one of the second user input password and the second user bio-information.

DETAILED DESCRIPTION OF THE EMBODIMENTS

Figure 1:
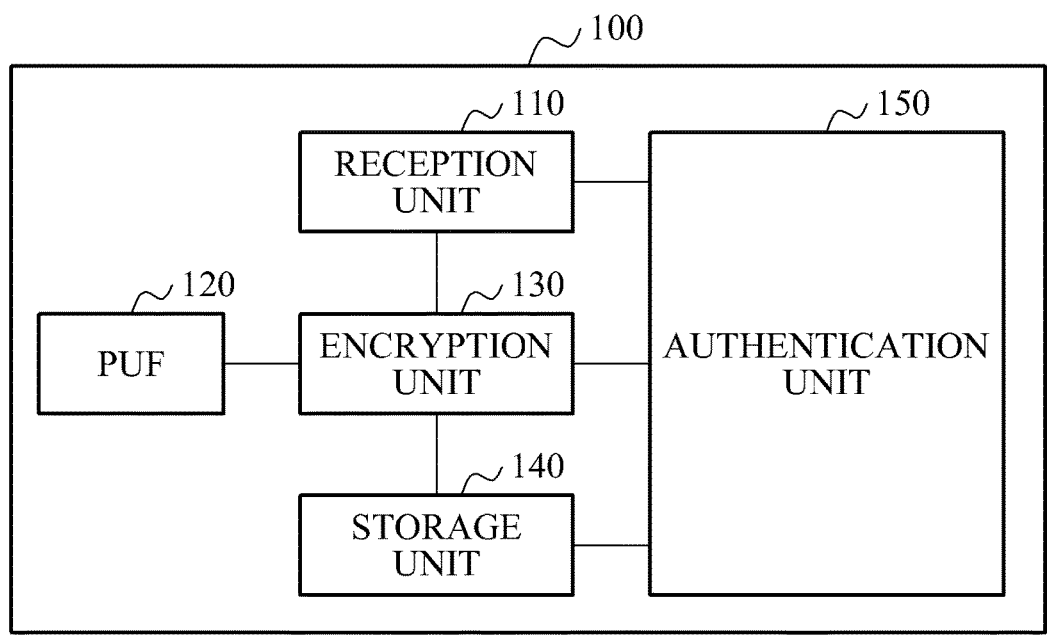
FIG. 1 illustrates an information processing apparatus according to an exemplary embodiment.

Hereinafter, exemplary embodiments of the present invention will be described in detail with reference to the accompanying drawings. However, the present invention should not be construed as limited to the embodiments set forth herein. Like reference numerals in the drawings denote like elements.

FIG. 1 illustrates an apparatus for processing information (hereinafter, also referred to as an "information processing apparatus") 100 according to an exemplary embodiment.

The information processing apparatus 100 according to the present embodiment may encrypt and securely store a password and/or bio-information received from a user and conduct secure authentication.

In the present embodiment, a reception unit 110 of the information processing unit 100 may receive a password input by a user (hereinafter, also referred to as a "user input password").

A process of registering the password input by the user and authenticating the user and/or a device using the registered password may be knowledge-based authentication. However, when the user input password is revealed by a security attack, knowledge-based authentication is not credible.

Thus, it is required to register and manage the user input password via high-level security processing.

In the present embodiment, the information processing apparatus 100 encrypts and stores or registers the user input password received by the reception unit 110. The received password may be a plain text.

In the present embodiment, the information processing apparatus 100 includes a physical unclonable function (PUF) 120 to generate a unique key as a random digital value invariable according to time using a process variation in a semiconductor process.

The digital value that the PUF 120 generates may be, for example, an N bit, where N is a natural number.

Although the unique key generated by the PUF 120 may be used intactly as an identification key for possession-based authentication, in the present exemplary embodiment, the user input password is encrypted using the unique key, thereby providing both possession-based authentication and knowledge-based authentication.

In this case, the unique key generated by the PUF 120 is not revealed to the outside, thereby ensuring high-level credibility and security. A configuration of the PUF 120 will be described in detail.

In the present embodiment, an encrypted value obtained by encrypting the password received from the user k times using the unique key generated by the PUF 120 as a round key used for an advanced encryption standard (AES) may be used as an identification key for authentication, where k is a natural number.

In the present embodiment, as described above, an encryption unit 130 encrypts the password received by the reception unit 110 k times in accordance with the AES or a triple data encryption standard (T-DES) using the unique key generated by the PUF 120 as a seed, thereby generating an identification key to be used for authentication.

Here, the AES or T-DES is provided for illustrative purposes only in the present embodiment, and various methods including a data encryption standard (DES) may be used.

In the present embodiment, the generated identification key may be stored in a storage unit 140.

The storage unit 140 may be configured as various kinds of non-volatile memories, such as a one-time programmable (OTP) memory and a flash memory.

The identification key stored in the storage unit 140 may be used for authentication of a user and/or a device on line, and the same identification key is prevented from being generated even though the password is revealed since it is impossible to duplicate the PUF 120.

In another exemplary embodiment, the stored identification key may serve as a gate to block external access to a device or chip that needs authenticating, such as a smart card.

Thus, the generated and stored identification key may be used for any authentication/security purpose, without being limited to the foregoing embodiments.

Meanwhile, according to another exemplary embodiment, the information processing apparatus 100 may use bio-information about the user, for example, information about a fingerprint and an iris of the user, for secure encrypting and storage in addition to the user input password.

In this embodiment, when the reception unit 110 receives the bio-information, the encryption unit 130 may encrypt the bio-information k times in accordance with the AES or T-DES using the unique key generated by the PUF 120.

When the identification key generated via encrypting is stored in the storage unit 140, the identification key is not decrypted into the bio-information without the unique key generated by the PUF 120, thus achieving high-level credibility and security.

The preceding process may be considered as a process of registering a user input and/or bio-information as an identification key used for authentication. In the present embodiment, the information processing apparatus 100 may further include an authentication unit 150 to authenticate a user and/or a device using the registered identification key.

In the embodiment where the user password is registered and used for authentication, the authentication unit 150 may verify whether a user password input for authentication is the registered password.

In one exemplary embodiment, when the password that the user inputs for authentication is input to the reception unit 110, the encryption unit 130 may encrypt the input password using the unique key generated by the PUF 120 and transmit the encrypted password to the authentication unit 150. Then, the authentication unit 150 may judge whether the encrypted password is identical to the registered identification key stored in advance in the storage unit 140 to determine whether password authentication succeeds or fails.

In another exemplary embodiment, when the password that the user inputs for authentication is input to the reception unit 110, the reception unit 110 may transmit the input password to the authentication unit 150. The encryption unit 130 may decrypt the identification key stored in advance in the storage unit 140 using the unique key generated by the PUF 120 and transmit the decrypted identification key to the authentication unit 150. Then, the authentication unit 150 may judge whether the user input password transmitted from the reception unit 110 is identical to the decrypted identification key transmitted from the encryption unit 130 to determine whether password authentication succeeds or fails.

Meanwhile, in the embodiment where the bio-information is registered and used for authentication, the authentication unit 150 may verify whether bio-information input for authentication is identical to the registered bio-information.

In one exemplary embodiment, when the bio-information for authentication is input to the reception unit 110, the encryption unit 139 may encrypt the input bio-information using the unique key generated by the PUF 120 and transmit the encrypted bio-information to the authentication unit 150. Then, the authentication unit 150 may judge whether the encrypted bio-information is identical to the registered identification key stored in advance in the storage unit 140 to determine whether password authentication succeeds or fails.

In another exemplary embodiment, when the bio-information for authentication is input to the reception unit 110, the reception unit 110 may transmit the input bio-information to the authentication unit 150. The encryption unit 130 may decrypt the identification key stored in advance in the storage unit 140 using the unique key generated by the PUF 120 and transmit the decrypted identification key to the authentication unit 150. Then, the authentication unit 150 may judge whether the bio-information transmitted from the reception unit 110 is identical to the decrypted identification key transmitted from the encryption unit 130 to determine whether password authentication succeeds or fails.

This embodiment may be useful for processing bio-information. An error may occur in identifying bio-information, such as a fingerprint or an iris pattern, whenever the bio-information is input. Thus, even though bio-information about an object the same as used for registration is input next time for authentication, the identified bio-information may not be totally identical to the registered bio-information. Thus, in a general authentication process of bio-information, a correspondence between the input bio-information and the bio-information registered in advance is judged.

In this embodiment, the bio-information input for authentication and transmitted to the reception unit 110 is transmitted to the authentication unit 150 without encrypting, and the authentication unit 150 may compare the decrypted identification key with the transmitted bio-information to determine whether authentication succeeds or fails based on a correspondence.

Hereinafter, an illustrative configuration of the PUF 120 according to an exemplary embodiment will be described.

The PUF 120 according to the present embodiment is configured to stochastically determine whether nodes generated on a semiconductor element are short-circuited in a process of manufacturing a semiconductor.

For instance, the PUF 120 generates N-bit digital values using a process variation occurring in the same semiconductor manufacturing process based on whether an interlayer contact between conductive layers short-circuits the conductive layers. The interlayer contact may be, for example, a via. Even though not indicated in the following description, the interlayer contact may include various conductive elements to electrically short-circuit conductive layers of a semiconductor.

An interlayer contact, that is, a via, is designed to connect conductive layers, and thus a size of the interlayer contact or the via is generally determined such that the interlayer contact short-circuits the conductive layers. In a general design rule, a minimum via size is defined to ensure that a via short-circuits conductive layers.

However, the PUF 120 according to the present embodiment is configured to form a via as an interlayer contact to intentionally have a smaller size than defined in the design rule. Thus, some of N vias short-circuit conductive layers and the other of the vias do not short-circuit the conductive layers, thereby stochastically determining whether the nodes are short-circuited.

In a conventional semiconductor process, it is considered as a failure of the process that the interlayer contact does not short-circuit the conductive layers. However, exemplary embodiments use a situation that the interlayer contact does not short-circuit the conductive layers for generating a unique key as a random digital value.

Setting the size of the interlayer contact, such as the via, according to the present embodiment will be described in detail with reference to FIGS. 2 and 3.

Meanwhile, according to another exemplary embodiment, the PUF 120 is configured to determine spacing between conductive lines to be intentionally narrower than defined in the design rule in a semiconductor manufacturing process to stochastically determine whether the conductive lines are short-circuited, thereby generating a unique key.

In the present embodiment, as the spacing between the conductive lines is adjusted to a minimum level or less according to a design rule to ensure openness between the conductive lines in the conventional semiconductor manufacturing process, the PUF 120 generates a unique key.

Setting the spacing between the conductive lines according to the present embodiment will be described in detail with reference to FIG. 4.

The unique key generated by the PUF 120 may be obtained by identifying using a read transistor whether the interlayer contact short-circuits the conductive layers. An illustrative example of the read transistor will be described in detail with reference to FIG. 6.

Meanwhile, in the embodiment of adjusting the size of the interlayer contact, even though sizes of interlayer contacts are adjusted such that a ratio of interlayer contacts short-circuiting conductive layers to interlayer contacts not short-circuiting conductive layers is almost ½, it may not be ensured that a proportion of short circuits (for example, represented by a digital value of 0) and a proportion of non-short circuits (for example, represented by a digital value of 1) are totally stochastically the same.

That is, as the sizes of the interlayer contacts, that is, the vias, increase close to a value defined in the design rule, a probability of short circuits between conductive layers becomes higher. On the contrary, as the sizes of the interlayer contacts, that is, the vias, decrease, a probability of non-short circuits becomes higher. However, when either one of the probability of short circuits and the probability of non-short circuits increases, randomness of generated unique keys is reduced.

Such a problem also occurs in the embodiment of adjusting the spacing between the conductive lines.

Thus, according to one exemplary embodiment, raw digital values that the PUF 120 generates are grouped and digital values of individual groups are compared, thereby determining a unique key generated by the PUF 120. This process is interpreted as a process of balancing the generated digital values between a digital value of 0 and a digital value of 1.

The balancing process will be described in detail with reference to FIG. 7.

Figure 2:
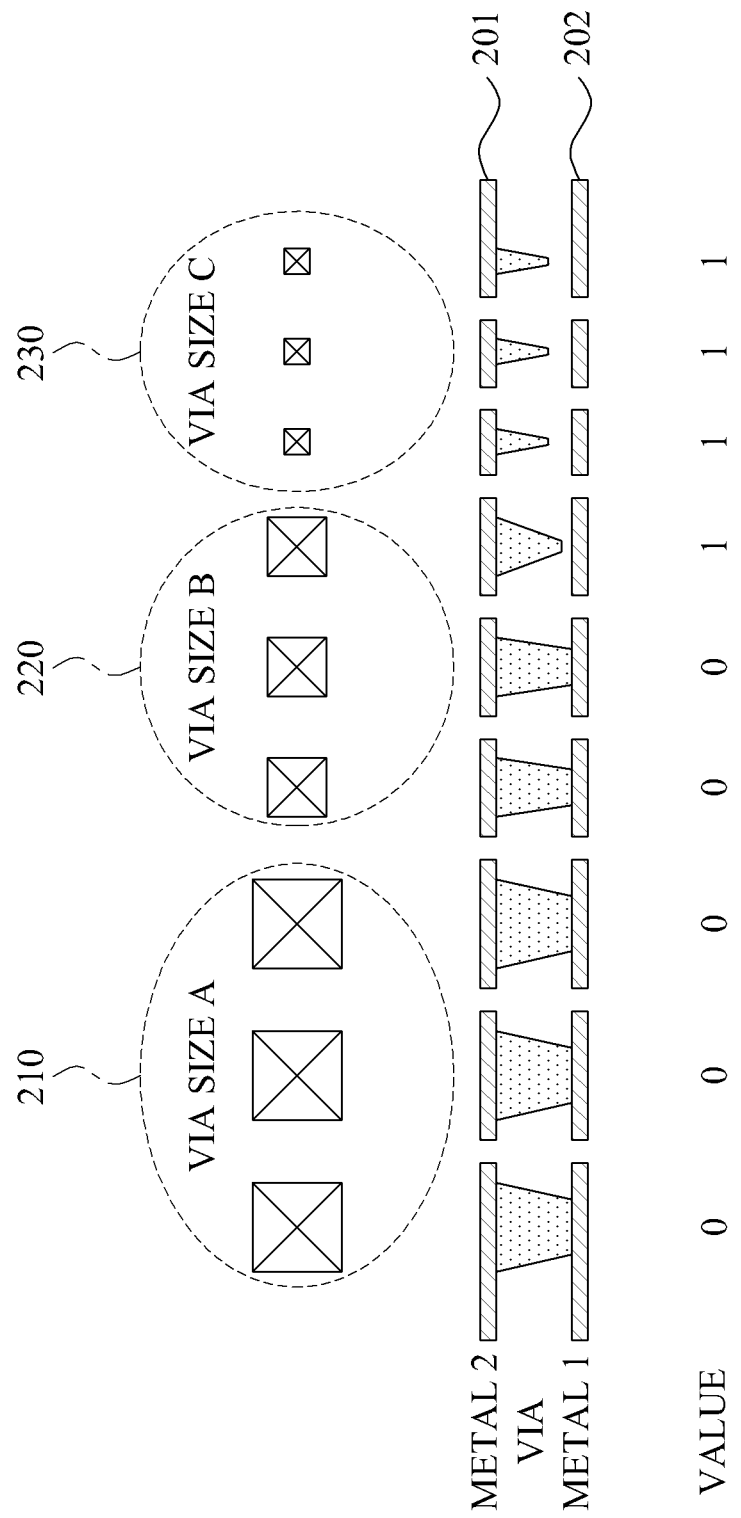
FIG. 2 is a conceptual diagram illustrating a configuration of a physically unclonable function (PUF) according to an exemplary embodiment.

FIG. 2 is a conceptual diagram illustrating a configuration of the PUF 120 according to an exemplary embodiment.

FIG. 2 shows interlayer contacts, for example, vias, formed between a metal 1 layer 202 and a metal 2 layer 201 in a semiconductor manufacturing process.

In a group 210 where vias are formed with a sufficiently large size according to the design rule, all vias short-circuit the metal 1 layer 202 and the metal 2 layer 201, and it is represented by a digital value of 0 that a via short-circuits the metal 1 layer 202 and the metal 2 layer 201.

Meanwhile, in a group 230 where vias are formed with a too small size, all vias do not short-circuit the metal 1 layer 202 and the metal 2 layer 201. Here, it is represented by a digital value of 1 that a via does not short-circuit the metal 1 layer 202 and the metal 2 layer 201.

In a group 220 where vias are formed with a size between the size of the group 210 and the size of the group 230, some vias short-circuit the metal 1 layer 202 and the metal 2 layer 201, while the other vias do not short-circuit the metal 1 layer 202 and the metal 2 layer 201.

The PUF 120 according to the present embodiment is configured to set a via size, as in the group 220, such that some vias short-circuit the metal 1 layer 202 and the metal 2 layer 201 and the other vias do not short-circuit the metal 1 layer 202 and the metal 2 layer 201.

The design rule for the via size may vary depending on a semiconductor manufacturing process. For example, the design rule for the via size is set for 0.25 microns (um) in a 0.18-micron (um) complementary metal-oxide-semiconductor (CMOS) process, while the PUF 120 according to the present embodiment is configured to set the via size for 0.19 microns so that a short circuit between the metal layers has a probability distribution.

It is ideal that the short circuit has a probability distribution of 50%, and thus the PUF 120 according to the present embodiment is configured to set the via size such that the probability distribution is nearly 50%. The via size may be determined by experiments in the process.

Figure 3:
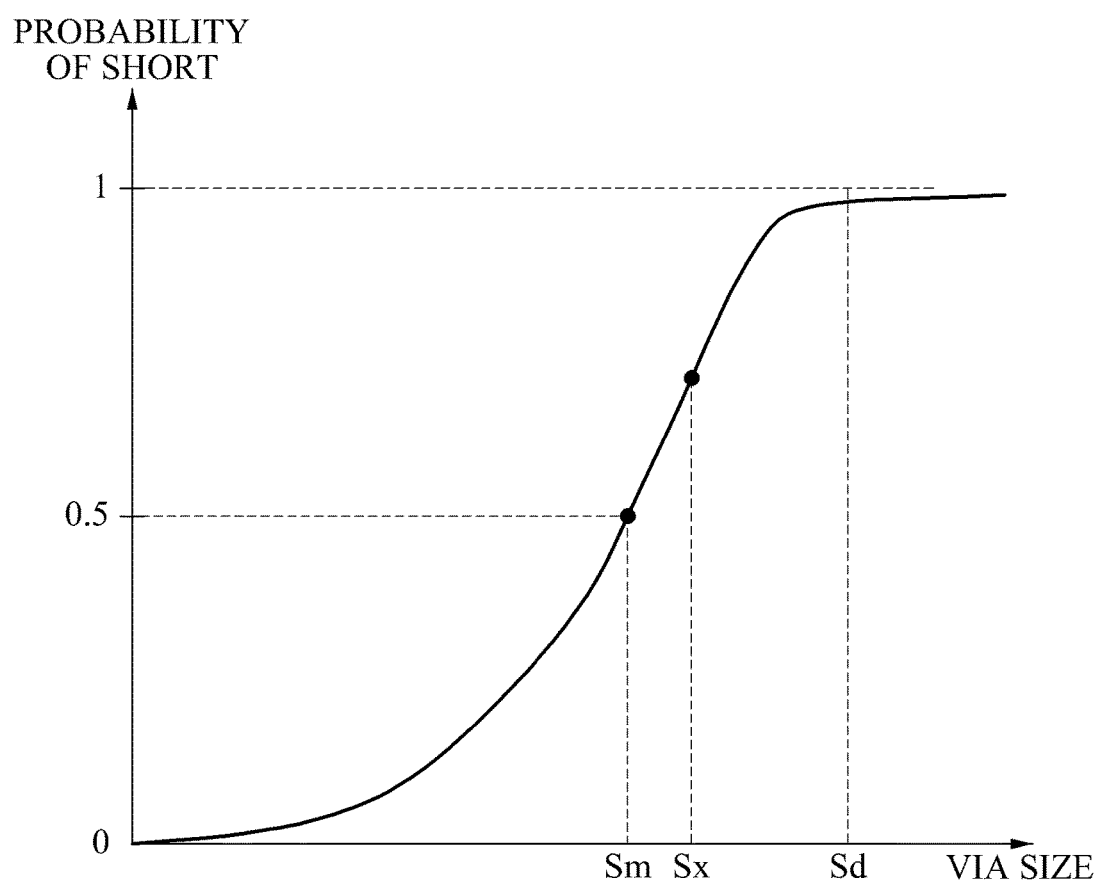
FIG. 3 is a graph illustrating the PUF of FIG. 2.

FIG. 3 is a graph illustrating the configuration of the PUF 120 according to the exemplary embodiment.

In the graph, as the via size becomes larger, a possibility of a short circuit between metal layers is close to 1. The via size according to the design rule is Sd, which ensures the short circuit between the metal layers.

$S_M$ is a theoretical via size when the possibility of the short circuit between the metal layers is 0.5. As described above, $S_M$ varies depending on a process and, although it is possible to obtain a via size closest to $S_M$ through experiments, it is difficult to find an exact $S_M$.

Thus, the PUF 120 according to the present embodiment may be configured through specific experiments such that the short circuit between the metal layers has a probability ranging between Sx1 and Sx2 with a preset tolerance based on 0.5 (Sx1 and Sx2 are not shown in the graph but are near Sx to form a range).

Figure 4:
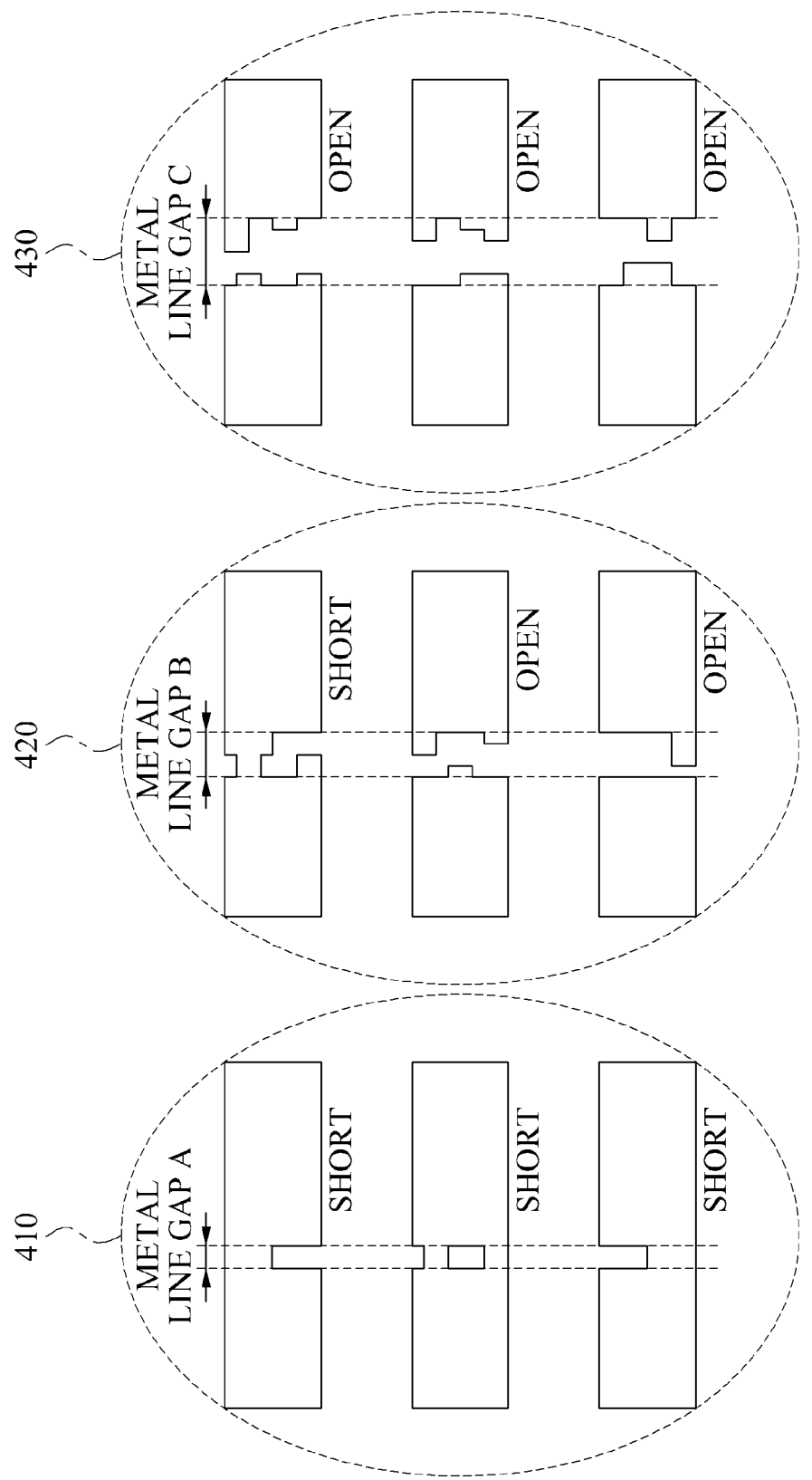
FIG. 4 is a conceptual diagram illustrating a configuration of a PUF according to another exemplary embodiment.

FIG. 4 is a conceptual diagram illustrating a configuration of the PUF 120 according to another exemplary embodiment.

According to the present embodiment, openness between metal lines are stochastically determined by adjusting gaps between the metal lines.

In a group 410 where gaps between metal lines are very narrow, all metal lines are short-circuited.

In a group 430 where gaps between metal lines are sufficiently wide, all metal lines are not short-circuited.

The PUF 120 according to the present embodiment sets gaps between metal lines, as in a group 420, such that short circuits stochastically occur, that is, some metal lines are short-circuited and the other metal lines are not short-circuited.

Figure 5:
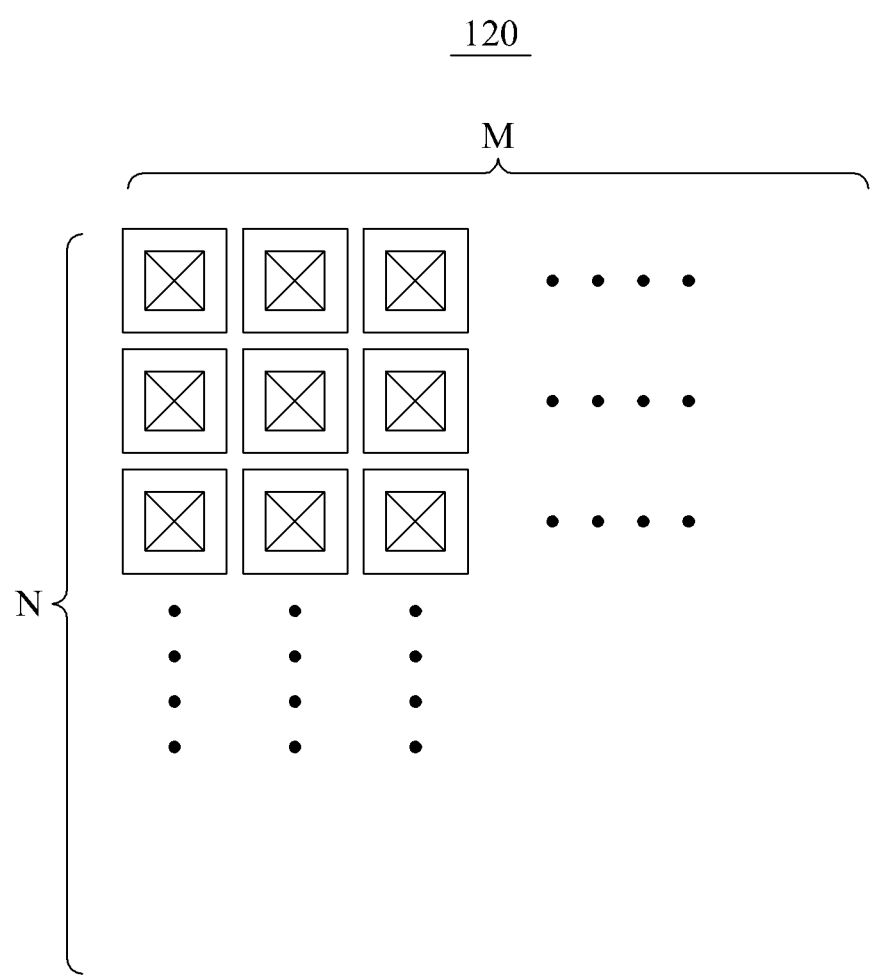
FIG. 5 illustrates an interlayer contact array for a PUF to generate a unique key according to an exemplary embodiment.

FIG. 5 illustrates an interlayer contact array for the PUF 120 to generate a unique key according to an exemplary embodiment.

FIG. 5 shows N vias in width and M vias in length, that is, M*N vias in total, formed between metal layers stacked on a semiconductor substrate, where M and N are natural numbers.

The PUF 120 generates unique keys as M*N-bit digital values based on whether each of the M*N vias short-circuits the metal layers (represented by a digital value of 0) or does not (represented by a digital value of 1).

The generated M*N-bit unique keys may be used as a seed key for the encryption unit 130 to encrypt a user input password and/or bio-information for registration.

Figure 6:
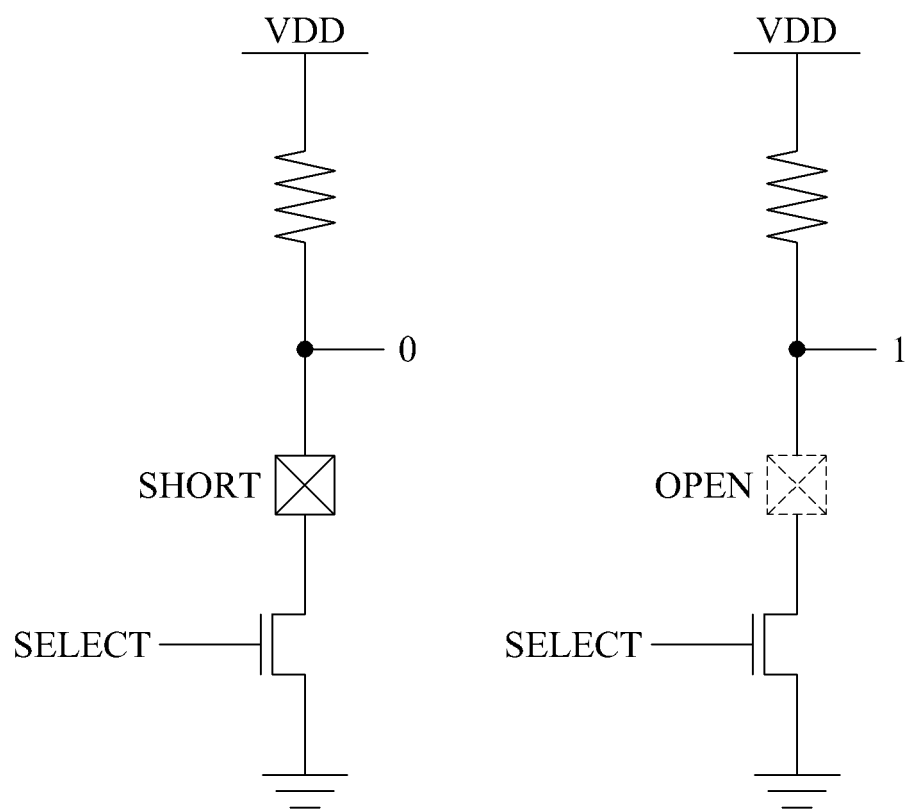
FIG. 6 illustrates a process of recognizing a unique key generated by the PUF according to an exemplary embodiment.

FIG. 6 illustrates a process of recognizing a unique key generated by the PUF 120 according to an exemplary embodiment.

According to the present embodiment, a read transistor between a reference voltage $V_{DD}$ and a ground examines whether any one node included in the PUF 120 is short-circuited.

In the embodiment of FIG. 6 employing a pull-down circuit, when one node in the PUF 120, for example, a via, short-circuits metal layers, an output level becomes 0. Otherwise, the output level becomes 1. In this process, a unique key generated by the PUF 120 may be read. Meanwhile, although not indicated in the specification, details of the embodiment employing the pull-down circuit may be also applied to an embodiment with a pull-up circuit, which is obvious to those skilled in the art which the present invention pertains to. Thus, the present invention may be embodied in many different forms and should not be construed as being limited to the embodiments set forth herein without specific statements.

In addition, an identification key is generated in the same manner in exemplary embodiments using a short circuit between metal lines.

Furthermore, such a process of reading a digital value is provided for illustrative purposes only, and other exemplary embodiments may also enable reading a digital value.

Therefore, various modifications and alternations may be made as long as a digital value is read by examining a short circuit between metal layers or metal lines in the PUF 120 without departing from the sprit and scope of the present invention, and such a configuration will be construed as being included in the scope of the present invention.

Figure 7:
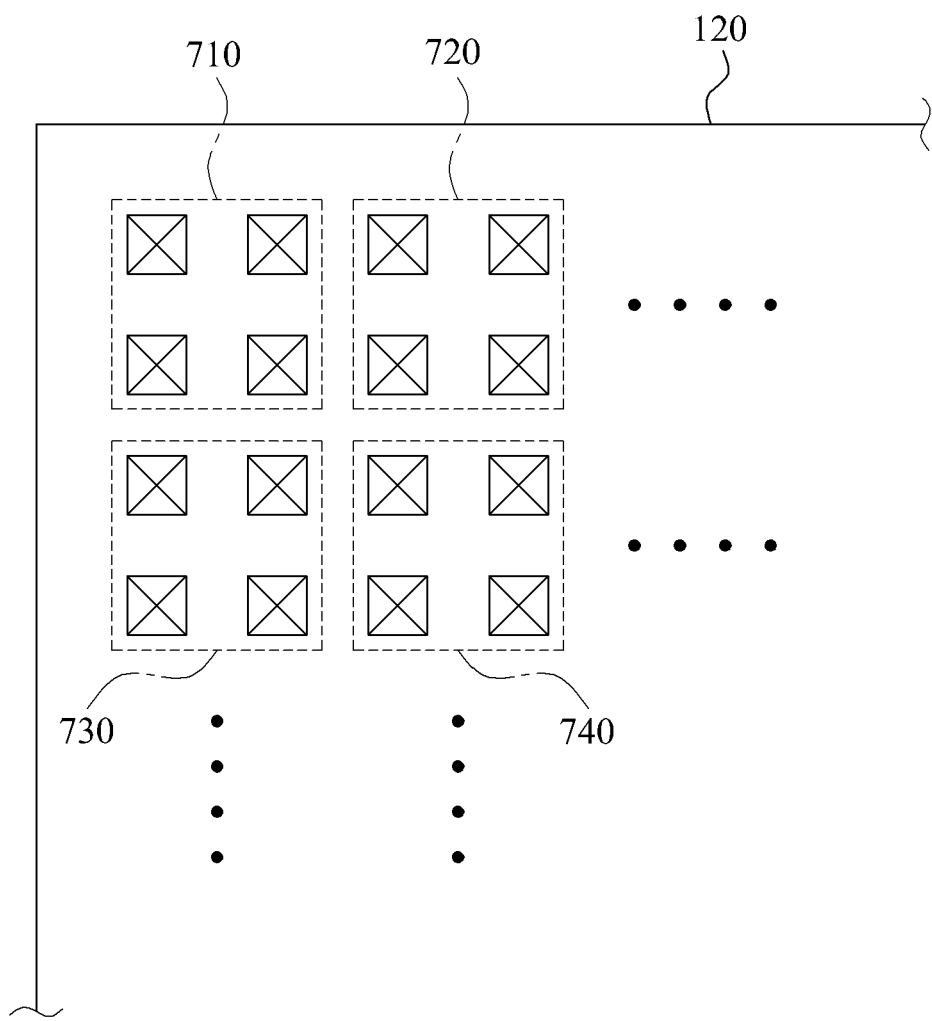
FIG. 7 is a conceptual diagram illustrating a process of balancing unique keys generated by the PUF according to an exemplary embodiment.

FIG. 7 is a conceptual diagram illustrating a process of balancing unique keys generated by the PUF according to an exemplary embodiment.

According to the present embodiment, the M*N-bit digital values generated by the PUF 120 may be grouped by a preset number.

In the present embodiment, four digital values are in one group.

When a plurality of digital value groups is generated, balancing a digital value of 0 and a digital value of 1 may be carried out by comparing digital values in individual groups.

For example, 4-bit digital values in a group 710 and in a group 720 are compared. When the 4-bit digital values in the group 710 are greater than the 4-bit digital values in the group 720, a digital value to represent the group 710 and the group 720 is determined as 1.

On the contrary, when the 4-bit digital values in the group 710 are smaller than the 4-bit digital values in the group 720, a digital value to represent the group 710 and the group 720 is determined as 0.

Alternatively, when the 4-bit digital values in the group 720 are greater than the 4-bit digital values in the group 710, a representative digital value may be determined as 1.

When the 4-bit digital values in the group 710 are the same as the 4-bit digital values in the group 720, a representative digital value may be determined as 1 or 0, or may not be determined.

Since a proportion of short circuits between conductive layers (represented by a digital value of 0) and a proportion of non-short circuits between conductive layers (represented by a digital value of 1) are different in each of a plurality of nodes in the PUF 120, balancing 0 and 1 may not be achieved.

A probability of each bit having 1 and a probability of each bit having 0 may be different in one group, while a probability is 50% that which group has a greater digital value in comparing different groups. For example, a probability that one group has a higher digital value than the other group among the two groups 710 and 720 is 50%. Thus, the preceding process may ensure stochastically balancing 0 and 1.

Further, another digital value of 1 may be generated by comparing a group 730 and a group 740, so that at least 2-bit unique keys may be provided through the groups 710 to 740.

When the digital values generated by the PUF 120 are balanced according to this process, randomness of the unique keys as the digital values generated by the PUF 120 may be secured at a high level.

As described above, the initially generated digital values are M*N bits, while digital values finally generated by the PUF 120 in FIG. 7 may be (M*N/8), because the embodiment of FIG. 7 determines a new 1-bit digital value using 8-bit digital values.

Thus, according to the present embodiment, the credible unique keys with satisfied randomness and time-invariance are generated by the PUF 120.

In one exemplary embodiment, the encryption unit 130 may encrypt a user input password and/or bio-information using the balanced unique keys.

When the unique keys are generated by the PUF 120, the unique keys have satisfied time-invariance with low costs, serve as a seed for the encryption unit 130 to encrypt a password in accordance with the AES, and are not revealed to the outside.

Figure 8:
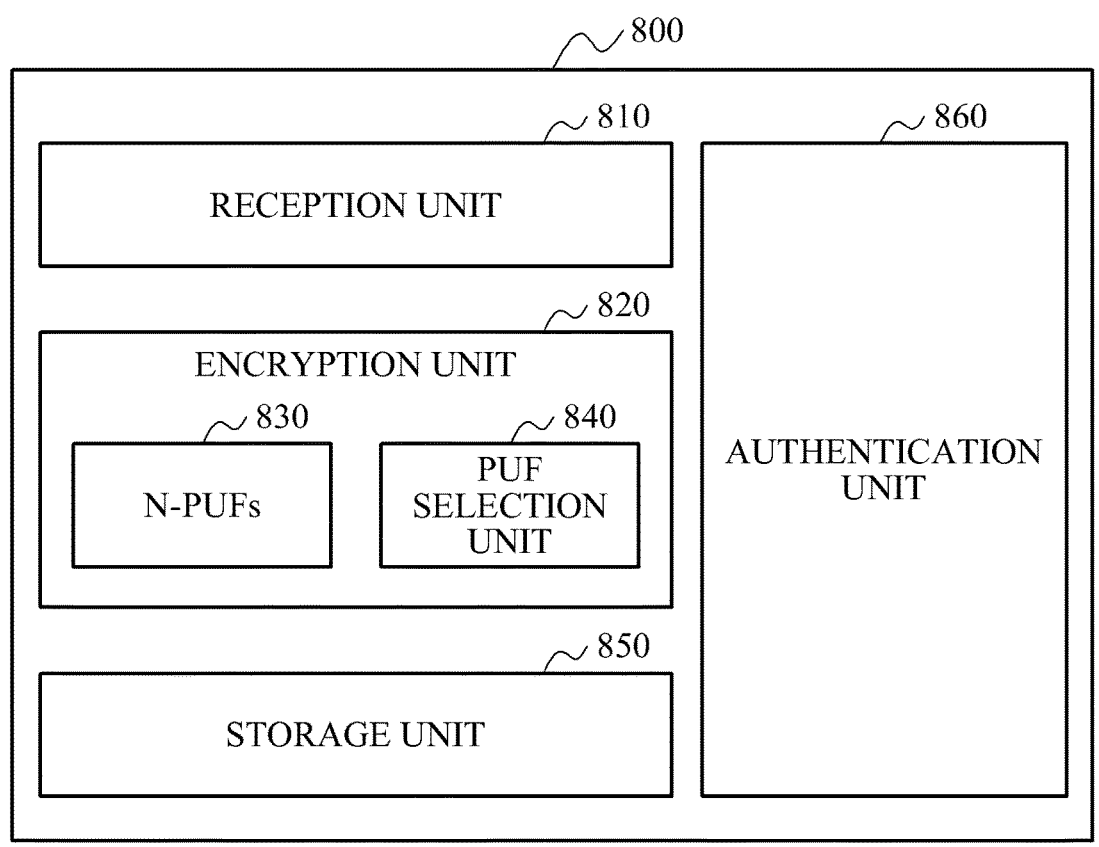
FIG. 8 illustrates an information processing apparatus according to another exemplary embodiment.

FIG. 8 illustrates an information processing apparatus according to another exemplary embodiment.

In the present embodiment, an encryption unit 820 of the information processing apparatus 800 may include N PUFs 830, where N is a natural number.

The N PUFs 830 may be included and hidden in the encryption unit 820 in a semiconductor manufacturing process.

Figure 9:
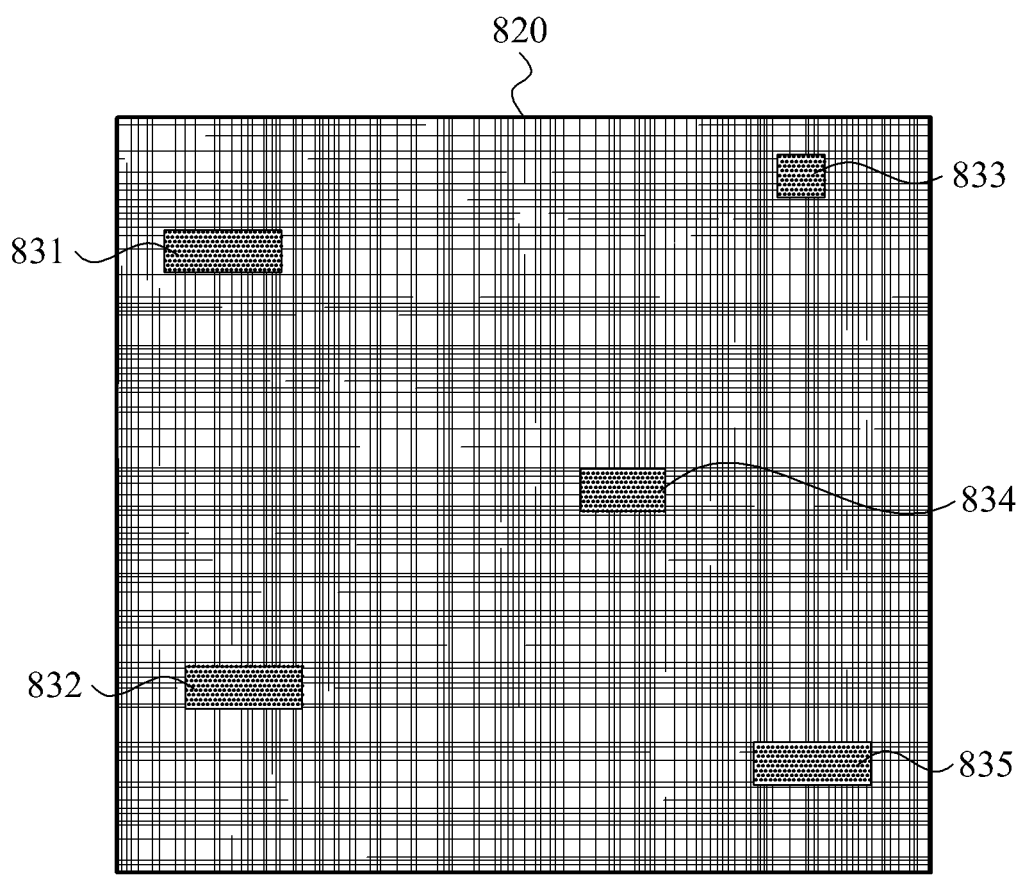
FIG. 9 illustrates an arrangement of PUFs in an encryption unit according to an exemplary embodiment.

The encryption unit 820 may include at least one PUF, for example, PUFs 831, 832, 833, 834 and 835 shown in FIG. 9.

The PUFs 831, 832, 833, 834 and 835 of FIG. 9 may independently or in association with each other generate a seed unique key used for encrypting a password and/or bio-information received by a reception unit 810 in accordance with the AES or T-DES.

Although a single PUF may be included in the encryption unit 820, a plurality of PUFs is included as shown in FIG. 9.

In the embodiment where a plurality of PUFs is included, the encryption unit 820 may further include a PUF selection unit 840.

The PUF selection unit 840 selects at least one of the PUFs 831, 832, 833, 834 and 835 to be used for the encryption unit 820 to encrypt a user input password and/or bio-information.

A process of storing an identification key generated by the encryption unit 820 in a storage unit 850 and a configuration of the storage unit 850 are the same as described in the embodiment of FIG. 1.

Further, an authentication unit 860 compares a user password and/or bio-information input for authentication with an identification key registered in advance to conduct authentication in the same manner as described above with reference to FIG. 1.

FIG. 9 illustrates an arrangement of PUFs in the encryption unit according to an exemplary embodiment.

When designing and manufacturing the encryption unit 820, the PUFs 831, 832, 833, 834 and 835 are hidden in the encryption unit 820, so that locations or functions of the PUFs 831, 832, 833, 834 and 835 may not be analyzed externally. That is, it is not only difficult to detect the locations of the respective PUFs 831, 832, 833, 834 and 835 but impossible to identify which PUF the encryption unit 820 uses as an encrypting seed key.

Thus, it is impossible to externally analyze an encrypting process of the encryption unit 820 through the PUFs 831, 832, 833, 834 and 835 and impossible to find a unique key even though probing into a bus through which the encryption unit 820 communicates with other components.

Ultimately, security for a process of encrypting the user input password and/or bio-information by the encryption unit 820 may be maintained at a high level.

Figure 10:
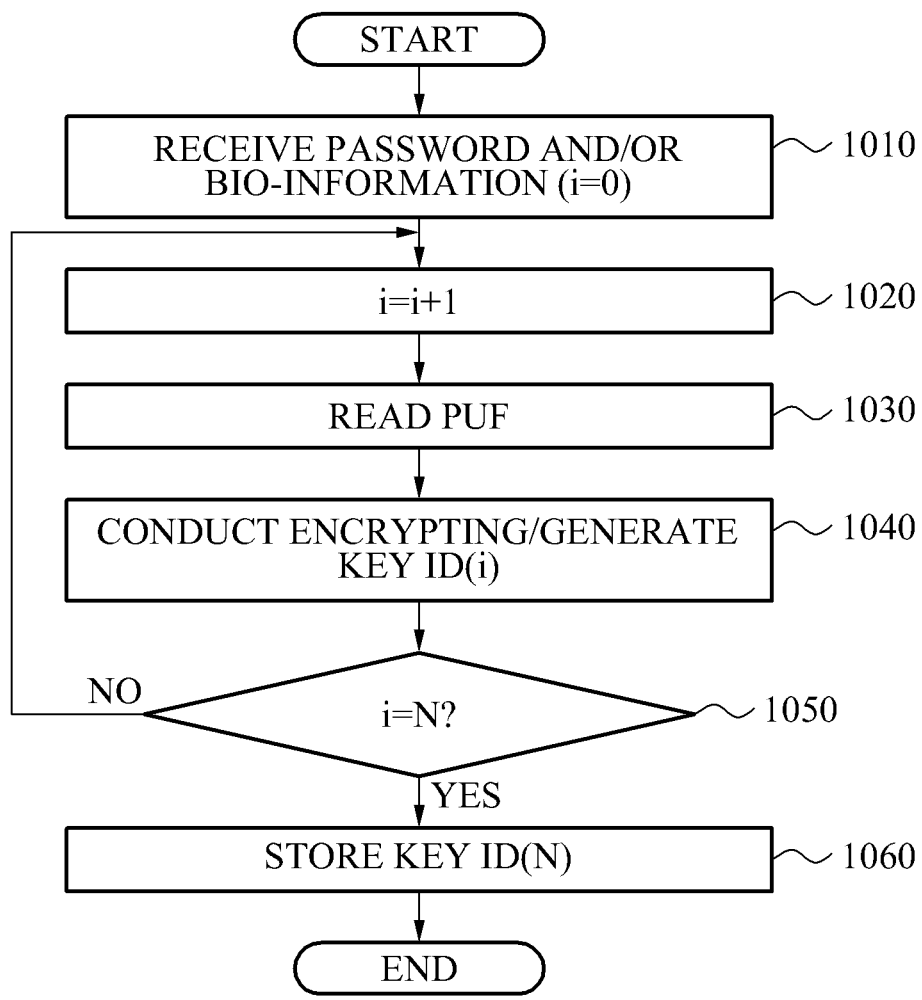
FIG. 10 is a flowchart illustrating a process of encrypting and storing a password and/or bio-information according to an information processing method according to an exemplary embodiment.

FIG. 10 is a flowchart illustrating a process of encrypting and storing or registering a password and/or bio-information according to an information processing method according to an exemplary embodiment.

Referring to FIG. 1, the reception unit 110 of the information processing apparatus 100 receives a user input password and/or bio-information in operation 1010. As described above, the received password and/or bio-information may realize knowledge-based authentication.

In operation 1020, in a process of encrypting the password and/or the bio-information in accordance with the AES or T-DES, an initial value i=0 is increased by 1 for N-time iterations, where N is a natural number.

A unique key provided by the PUF 120 is read in operation 1030, and an $i^{th}$ iteration is carried out to generate a key ID(i) in operation 1040.

In operation 1050, an iteration is carried out until i becomes N.

The encryption unit 120 generates a key ID(N) as a final identification key through N-time iterations, and the generated identification key ID(N) is stored in the storage unit 140 in operation 1060.

Figure 11:
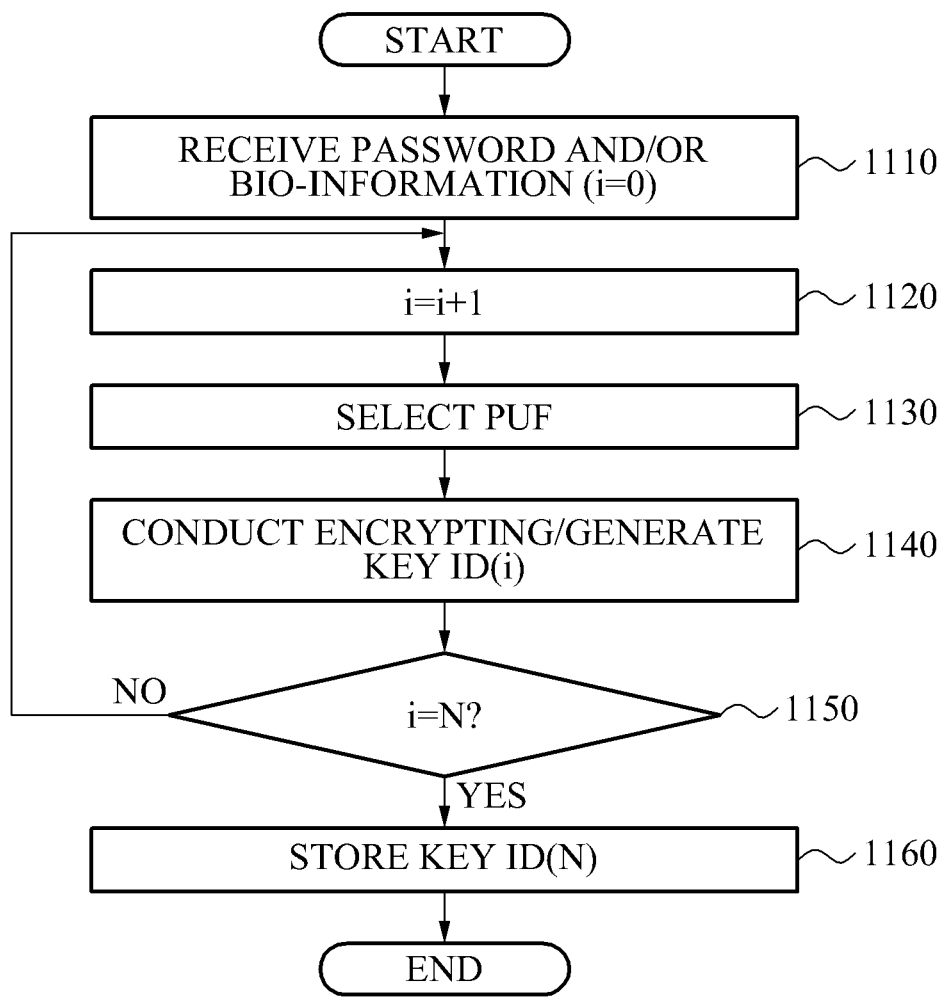
FIG. 11 is a flowchart illustrating a process of encrypting and storing a password and/or bio-information by the information processing apparatus of FIG. 8.

FIG. 11 is a flowchart illustrating a process of encrypting and storing a password and/or bio-information by the information processing apparatus of FIG. 8.

In operation 1110, a password is received and an initial value of an iteration i is set for 0 in the same manner as in FIG. 10.

The i value is increased by 1 in operation 1120, and the PUF selection unit 840 selects one of the PUFs 831, 832, 833, 834 and 835 described with reference to FIGS. 8 and 9.

A selection process may be carried out newly in each iteration or just once.

An identification key ID(i) is generated in an $i^{th}$ iteration using a digital value provided by the selected PUF in operation 1140, and iterations are repeated N times in operation 1150.

The encryption unit 820 conducts encrypting N times to generate an identification key ID(N), and the generated key ID(N) is stored in the storage unit 850 in operation 1160.

Figure 12:
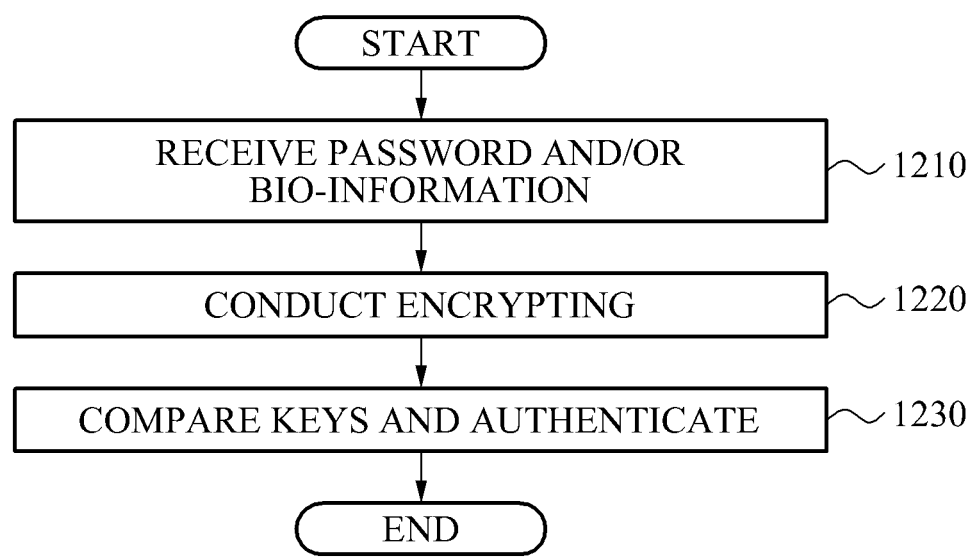
FIG. 12 is a flowchart illustrating a process of authenticating a user input password and/or bio-information by an information processing apparatus according to an exemplary embodiment.

FIG. 12 is a flowchart illustrating a process of authenticating a user input password and/or bio-information by an information processing apparatus according to an exemplary embodiment.

FIGS. 10 and 11 show that the information processing apparatus 100 or the information processing apparatus 800 first registers a password and/or bio-information used for authentication, while FIG. 12 illustrates an actual authentication process after the password and/or bio-information is encrypted and registered.

In operation 1210, a password and/or bio-information that a user inputs for authentication may be input to the reception unit 110 or 810.

In operation 1220, the encryption unit 130 or 820 may encrypt the input password and/or bio-information using a unique key generated by the PUF, and transmit the encrypted password and/or bio-information to the authentication unit 150 or 860.

The authentication unit 150 or 860 may judge whether the encrypted password and/or bio-information is identical to a registered identification key stored in advance in the storage unit 140 or 850 to determine whether authentication of the password and/or bio-information succeeds or fails.

Figure 13:
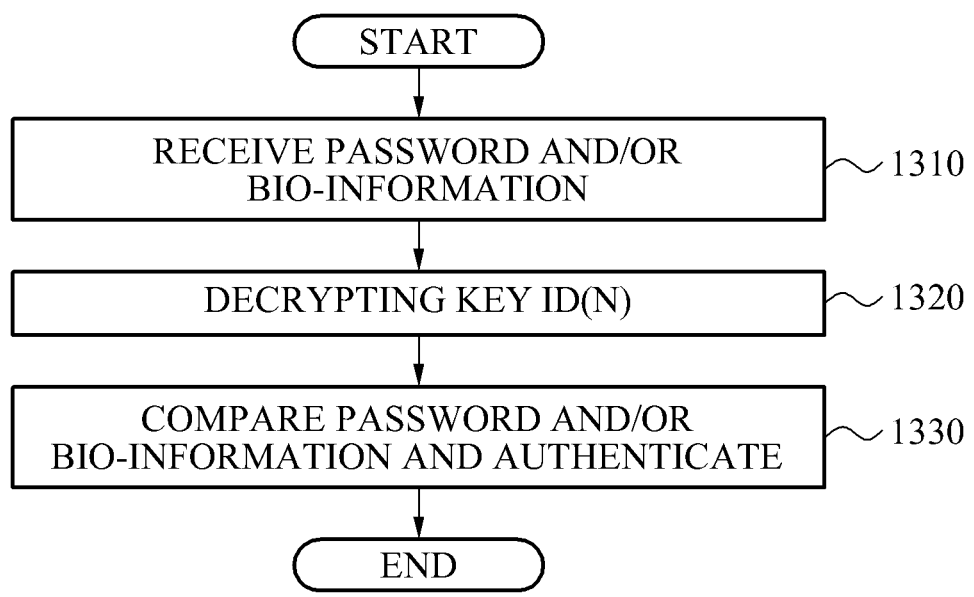
FIG. 13 is a flowchart illustrating a process of authenticating a user input password and/or bio-information by an information processing apparatus according to another exemplary embodiment.

FIG. 13 is a flowchart illustrating a process of authenticating a user input password and/or bio-information by an information processing method according to another exemplary embodiment.

In operation 1310, a password and/or bio-information that a user inputs for authentication may be input to the reception unit 110 or 810. The reception unit 110 or 810 may transmit the input password and/or bio-information to the authentication unit 150 or 860.

In operation 1320, the encryption unit 130 or 820 may decrypt an identification key ID(N) stored in advance in the storage unit 140 or 850 and transmit the decrypted identification key to the authentication unit 150 or 860.

In operation 1330, the authentication unit 150 or 860 may judge whether the user input password and/or bio-information transmitted from the reception unit 110 or 810 is identical to the decrypted identification key transmitted from the encryption unit 130 or 820 to determine whether authentication of the password and/or bio-information succeeds or fails.

As described above with reference to FIG. 1, the embodiment shown in FIG. 13 may be useful for processing bio-information. An error may occur in identifying bio-information, such as a fingerprint or an iris pattern, whenever the bio-information is input. Thus, even though bio-information about an object the same as used for registration is input next time for authentication, the identified bio-information may not be totally identical to the registered bio-information. Thus, in a general authentication process of bio-information, a correspondence between the input bio-information and the bio-information registered in advance is judged.

In the embodiment of FIG. 13, instead of comparing a result of encrypting of the bio-information input for authentication and transmitted to the reception unit 110 or 810 with the identification key registered in advance, the identification key registered in advance is decrypted and compared with the bio-information, thereby determining whether authentication succeeds or fails based on a correspondence.

According to the foregoing exemplary embodiments, a user password and/or bio-information used for authentication may be securely encrypted and managed. Further, in authentication, not only the user input password and/or bio-information but also a unique key of a PUF embedded in a device is used, thus providing high-credibility authentication.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An information processing apparatus comprising:
a physical unclonable function (PUF) to generate at least one unique key using whether a short or open occurs between nodes generated on a semiconductor element by a process variation in a semiconductor manufacturing process; and
an encryption unit to encrypt a password received from a user using the unique key to generate an identification key.

2. The information processing apparatus of claim 1, wherein the PUF generates the unique key using whether an interlayer contact formed between conductive layers of a semiconductor short-circuits the conductive layers.

3. The information processing apparatus of claim 2, wherein the interlayer contact formed between the conductive layers of the semiconductor is formed to have a smaller size than that according to a design rule provided in the semiconductor manufacturing process.

4. The information processing apparatus of claim 2, wherein the PUF is configured to set the size of the interlayer contact formed between the conductive layers of the semiconductor such that a difference between a probability of the interlayer contact short-circuiting the conductive layers and a probability of the interlayer contact not short-circuiting the conductive layers is within a preset error range.

5. The information processing apparatus of claim 1, wherein the PUF comprises N unit structures to generate a 1-bit digital value using a pair of conductive layers and one interlayer contact connecting the conductive layers and generates N-bit unique keys through the N unit structures, N being a natural number.

6. The information processing apparatus of claim 5, wherein the PUF generates N-bit digital values, and the information processing apparatus groups digital values comprised in the N-bit unique keys by k units, compares a first group with a second group among a plurality of groups, and determines a digital value representing the first group and the second group as 1 when a value of k digital bits comprised in the first group is greater than a value of k digital bits comprised in the second group, k being a natural number.

7. The information processing apparatus of claim 6, wherein the information processing apparatus selectively determines the digital value representing the first group and the second group as either one of 1 and 0 or does not determine the digital value representing the first group and the second group based on a setting when the value of the k digital bits comprised in the first group is the same as the value of the k digital bits comprised in the second group.

8. The information processing apparatus of claim 1, wherein the encryption unit encrypts the password N times using the unique key as a round key to generate the identification key, N being a natural number.

9. The information processing apparatus of claim 8, wherein the encryption unit encrypts the password in accordance with an advanced encryption standard (AES) or a triple data encryption standard (T-DES) to generate the identification key.

10. An information processing apparatus comprising:
a physical unclonable function (PUF) to generate at least one unique key using whether a short or open occurs between nodes generated on a semiconductor element by a process variation in a semiconductor manufacturing process; and
an encryption unit to encrypt input bio-information using the unique key to generate an identification key.

11. The information processing apparatus of claim 10, wherein the PUF generates the unique key using whether an interlayer contact formed between conductive layers of a semiconductor short-circuits the conductive layers.

12. The information processing apparatus of claim 11, wherein the interlayer contact formed between the conductive layers of the semiconductor is formed to have a smaller size than that according to a design rule provided in the semiconductor manufacturing process.

13. The information processing apparatus of claim 11, wherein the PUF is configured to set the size of the interlayer contact formed between the conductive layers of the semiconductor such that a difference between a probability of the interlayer contact short-circuiting the conductive layers and a probability of the interlayer contact not short-circuiting the conductive layers is within a preset error range.

14. An information processing apparatus comprising:
at least one physical unclonable function (PUF) to generate a unique key of at least one digital value using whether a short or open occurs between nodes generated on a semiconductor element by a process variation in a semiconductor manufacturing process and an encryption unit to encrypt at least one of a password received from a user and bio-information using at least one unique key provided by at least one of the at least one PFU to generate an identification key.

15. The information processing apparatus of claim 14, wherein the encryption unit encrypts the at least one of the password and the bio-information N times using the at least one unique key as a round key to generate the identification key, N being a natural number.

16. The information processing apparatus of claim 15, wherein the encryption unit encrypts the at least one of the password and the bio-information in accordance with an advanced encryption standard (AES) or a triple data encryption standard (T-DES) to generate the identification key.

17. The information processing apparatus of claim 14, wherein each of the at least one PUF generates the unique key using whether an interlayer contact formed between conductive layers of a semiconductor short-circuits the conductive layers.

18. The information processing apparatus of claim 17, wherein the interlayer contact is formed to have a smaller size than that according to a design rule provided in the semiconductor manufacturing process.

19. The information processing apparatus of claim 17, wherein the PUF is configured to set the size of the interlayer contact formed between the conductive layers of the semiconductor such that a difference between a probability of the interlayer contact short-circuiting the conductive layers and a probability of the interlayer contact not short-circuiting the conductive layers is within a preset error range.

20. The information processing apparatus of claim 14, further comprising a PUF selection unit to select a PUF to be used by the encryption unit for encrypting among the at least one PUF.

21. An information processing method comprising:
generating, by a physical unclonable function (PUF) of an information processing apparatus, at least one unique key using whether a short or open occurs between nodes generated on a semiconductor element by a process variation in a semiconductor manufacturing process; and
encrypting, by an encryption unit of the information processing apparatus, at least one of a first user input password and first user bio-information input to the information processing apparatus using the unique key to generate at least one of an encrypted password and encrypted bio-information.

22. The information processing method of claim 21, further comprising:
encrypting at least one of a second user input password and second user bio-information when the at least one of the second user input password and the second user bio-information is input to the information processing apparatus from a user; and
comparing, by an authentication unit of the information processing apparatus, at least one of the encrypted second user input password and the encrypted second user bio-information with the at least one of the encrypted password and the encrypted bio-information.

23. The information processing method of claim 21, further comprising:
decrypting, by the encryption unit of the information processing apparatus, at least one of the encrypted password and the encrypted bio-information to generate the at least one of the first user input password and the first user bio-information when the at least one of the second user input password and the second user bio-information is input to the information processing apparatus from a user; and
comparing, by an authentication unit of the information processing apparatus, the at least one of the decrypted first user input password and the decrypted first user bio-information with at least one of the second user input password and the second user bio-information.

* * * * *

UNITED STATES PATENT AND TRADEMARK OFFICE
CERTIFICATE OF CORRECTION

PATENT NO. : 9,722,786 B2
APPLICATION NO. : 14/422668
DATED : August 1, 2017
INVENTOR(S) : Dong Kyue Kim et al.

Page 1 of 1

It is certified that error appears in the above-identified patent and that said Letters Patent is hereby corrected as shown below:

In the Claims

Column 15, Line 26, Claim 14 "PFU" should read -- PUF --.

Signed and Sealed this
Tenth Day of July, 2018

Andrei Iancu
*Director of the United States Patent and Trademark Office*